US010683954B2

(12) United States Patent
Flynn et al.

(10) Patent No.: US 10,683,954 B2
(45) Date of Patent: Jun. 16, 2020

(54) BULKHEAD CONNECTOR ASSEMBLY

(71) Applicant: Eaton Corporation, Cleveland, OH (US)

(72) Inventors: William T. Flynn, Horton, MI (US); Daniel Gates, Rockaway, NJ (US); Thomas A. Parrish, Parma, MI (US)

(73) Assignee: Eaton Intelligent Power Limited (IE)

( * ) Notice: Subject to any disclaimer, the term of this patent is extended or adjusted under 35 U.S.C. 154(b) by 720 days.

(21) Appl. No.: 15/304,001

(22) PCT Filed: Apr. 14, 2015

(86) PCT No.: PCT/IB2015/052724
§ 371 (c)(1),
(2) Date: Oct. 13, 2016

(87) PCT Pub. No.: WO2015/159227
PCT Pub. Date: Oct. 22, 2015

(65) Prior Publication Data
US 2017/0030499 A1    Feb. 2, 2017

Related U.S. Application Data

(60) Provisional application No. 61/979,650, filed on Apr. 15, 2014.

(51) Int. Cl.
*F16L 25/01* (2006.01)
*F16L 27/12* (2006.01)
(Continued)

(52) U.S. Cl.
CPC .............. *F16L 25/01* (2013.01); *F16L 27/12* (2013.01); *F16L 37/088* (2013.01); *F16L 37/0887* (2019.08); *F16L 37/505* (2013.01)

(58) Field of Classification Search
CPC ....... F16L 25/01; F16L 37/505; F16L 37/252; F16L 37/24; F16L 37/113; F16L 37/0915; F16L 37/088; F16L 27/12
(Continued)

(56) References Cited

U.S. PATENT DOCUMENTS 8,632,104 B2    1/2014   Horikawa et al.
2009/0230671 A1*   9/2009   Stein
(Continued)

FOREIGN PATENT DOCUMENTS

DE          20313792 U1     11/2003
EP           1840438 A1     10/2007
WO      WO-2012088055 A1    6/2012

OTHER PUBLICATIONS

English abstract provided for DE-20313792.

*Primary Examiner* — Zachary T Dragicevich
(74) *Attorney, Agent, or Firm* — Fishman Stewart PLLC

(57) ABSTRACT

An exemplary bulkhead connector assembly may include a housing that has an inner diameter surface, a first opening and a second opening. The assembly may further have a retainer attached to the housing and one or more feet extending radially inward from the inner diameter surface of the housing. The assembly can also include a collar that has a portion received within the first opening or the second opening. The collar may have an outer surface that cooperates with the feet of the retainer to hold a conduit within the housing.

18 Claims, 7 Drawing Sheets

(51) Int. Cl.
*F16L 37/088* (2006.01)
*F16L 37/50* (2006.01)

(58) Field of Classification Search
USPC .................. 285/302, 321, 308, 377; 244/131
See application file for complete search history.

(56) References Cited

U.S. PATENT DOCUMENTS

2012/0068454 A1* 3/2012 Hamaguchi ........... F16L 37/088
2014/0246112 A1* 9/2014 Flynn ..................... F16L 25/01

* cited by examiner

BULKHEAD CONNECTOR ASSEMBLY

CROSS-REFERENCE TO RELATED APPLICATIONS

This Application claims the benefit of U.S. Provisional Application No. 61/979,650 filed on Apr. 15, 2014 which is hereby incorporated by reference in its entirety.

FIELD

Adjustable joints or fittings for tube assemblies are disclosed, wherein the joints are configured to connect corresponding tubing sections in response to single hand operation of the joint.

BACKGROUND

Fuel handling systems on aircrafts include tubing assemblies that have sections of metallic and/or non-metallic composite tubing coupled to one another by adjustable connectors. The systems can include support devices that attach the tubing assemblies to aircraft structures, such as wing structures, which move and vibrate relative to other aircraft structures during all flight conditions. The adjustable connectors permit tubing fitted therein to move and vibrate, thereby permitting the associated aircraft structure to move without applying additional loads to the same or restricting its normal motion.

Moreover, typical fuel handling systems further include an electrical bonding system, which safely conveys electrical charges that are generated, stored and would build in the adjustable connectors and associated fuel handling components. In particular, lightning strikes and the conveyance of fuel through the tubing could create an electrical potential between the tubing and the aircraft structure, which could result in an electrical discharge in the form of a spark that could damage certain aircraft components. The electrical bonding system electrically connects the adjustable connectors and remaining fuel handling components to the electrical bonding grid of the aircraft. In this way, the electrical bonding system can safely convey the electrical charges forming in the fuel handling systems to the aircraft's bonding grid and thus preventing any associated sparking.

The adjustable connectors facilitate the conveyance of fluid, while permitting tubing movement and vibrations and the safe conveyance of electrical charges, when the adjustable connectors are properly installed in fully engaged positions and remain fully engaged during all operation of the aircraft. Installation of these adjustable connectors can require access to a significant number of narrow spaces within aircraft structures. In this respect, it can be somewhat cumbersome to handle and operate the connectors within these narrow spaces to install the connectors. It would therefore be desirable to provide a bulkhead connector assembly that can require only single-hand operation for connecting and disconnecting the corresponding tubing sections of a fluid handling system.

SUMMARY OF THE EMBODIMENTS

An exemplary bulkhead connector assembly includes a housing that has an inner diameter surface, a first opening and a second opening. The assembly may further have a retainer attached to the housing and one or more feet extending radially inward from the inner diameter surface of the housing. The assembly may also include a collar that has a portion received within the first opening or the second opening. The collar may have an outer surface that cooperates with the feet of the retainer to permit the collar to maintain a conduit within the housing.

Another exemplary bulkhead connector assembly may include a housing that has an inner diameter surface, a first opening and a second opening. The assembly may further include a collar having a portion received within the first opening or the second opening. Moreover, the assembly may include a retainer, which is attached to the housing and has multiple feet extending radially inward from the inner diameter surface of the housing. The assembly may also include a resilient annular member that is attached to the housing. The resilient annular member and the feet of the retainer may hold the collar in the housing so as to connect corresponding fluid handling tubing components to one another.

Still another exemplary bulkhead connector assembly may include a housing that has an inner diameter surface, a first opening and a second opening. The assembly may also include a collar that has a portion received within the first opening or the second opening The assembly may further have a retainer, which is attached to the housing and has a plurality of feet extending radially inward from the inner diameter surface of the housing. Moreover, the assembly may further include a bonding ring that is received within an annular recess formed in the inner diameter surface of the housing. The bonding ring may extend between the housing and the collar to provide an electrically conductive path therebetween. The assembly may also include a resilient annular member attached to the housing. The resilient annular member and the feet of the retainer may hold the collar in the housing so as to connect the corresponding fluid handling components.

BRIEF DESCRIPTION OF THE DRAWINGS

Embodiments of the invention will now be described by way of example in greater detail with reference to the attached figures, in which.

DETAILED DESCRIPTION

Figure 1:
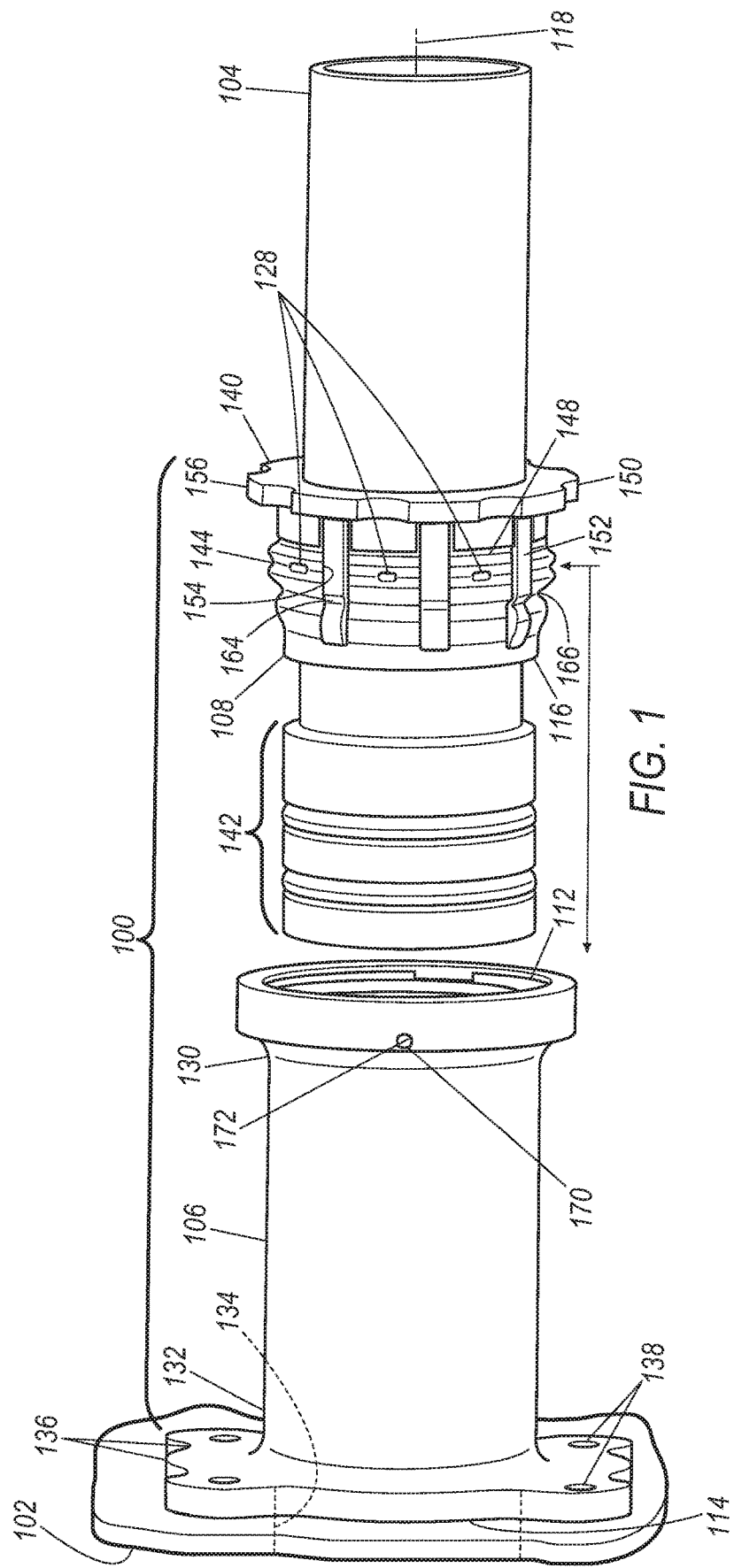
FIG. 1 is a side view of an exemplary bulkhead connector assembly including a housing attached to a bulkhead and a collar carried by a fluid line, before connecting the bulkhead and fluid line to one another.

Referring now to the discussion that follows and also to the drawings, illustrative approaches are shown in detail. Although the drawings represent some possible approaches, the drawings are schematic in nature and thus not drawn to scale, with certain features exaggerated or removed to better illustrate and explain the present disclosure. Further, the descriptions set forth herein are not intended to be exhaustive or otherwise limit or restrict the claims to the precise forms and configurations shown in the drawings and disclosed in the following detailed description.

FIGS. 1-4 generally illustrate an exemplary bulkhead connector assembly 100 utilized to connect a bulkhead 102 and a fluid line 104. However, the assembly 100 may instead be used to connect two fluid handling components of any kind. This assembly 100 includes two separate sub-assemblies, a housing assembly 181 and a collar assembly 180, which are configured to connect the bulkhead 102 and the conduit 104, e.g. a fuel line or vent line, to one another. In this example, all components of the assembly 100 are made of electrically conductive materials, including those that satisfy current aerospace resistance requirements. However, one or more components may not be electrically conductive, and have various properties independent of aerospace requirements. Moreover, each one of the components of the assembly 100 includes an electrical bonding path to the conductive mounting flange face of the bulkhead flange. In other examples, fewer than all components of the assembly may include an electrical bonding path to the conductive mounting flange face.

The housing assembly 181 includes a housing 106, a retention ring 120 ("main retainer ring"), a bonding ring 150 that bonds and centers the main retention ring 120, and a retainer 122 ("redundant locking clip"). Moreover, the collar assembly 180 includes a collar 148 and a handle 140, which in one form may be parts that are attached to one another by a snap-fit arrangement. Once snapped together, the handle is permitted to axially slide along longitudinal channels 154, e.g. slots, formed in the collar.

In one example, a manufacturer of the bulkhead connector assembly 100 can deliver the housing assemblies to one customer and the collar assemblies to another customer. In particular, the housing assembly 181 may be shipped to an aircraft OEM for installation on the aircraft. While the collar assembly 180 may shipped to a conduit manufacturer, such a manufacturer of fuel or vent tubes, for assembly onto the individual conduit assemblies. However, the bulkhead connector assembly 100 or portions thereof may be sold, used or made by any number of other suitable ways. Two collar assemblies 180 may be attached to a respective one of two injection molded ends of each conduit assembly. Further, each injection molded end can include three separate molded rings, which form two glands or grooves configured to receive the elastomeric seals. The conduit can terminate with one molded ring or gland that provides a stop for the collar assembly 180 to engage. The conduit is permitted to slide axially inside both the collar assembly 180 and within the housing assembly 181. Thus, the conduit assembly 180 is retained inside the housing assembly 181 when the collar assembly 180 is fully connected to the housing assembly 181.

Figure 2:
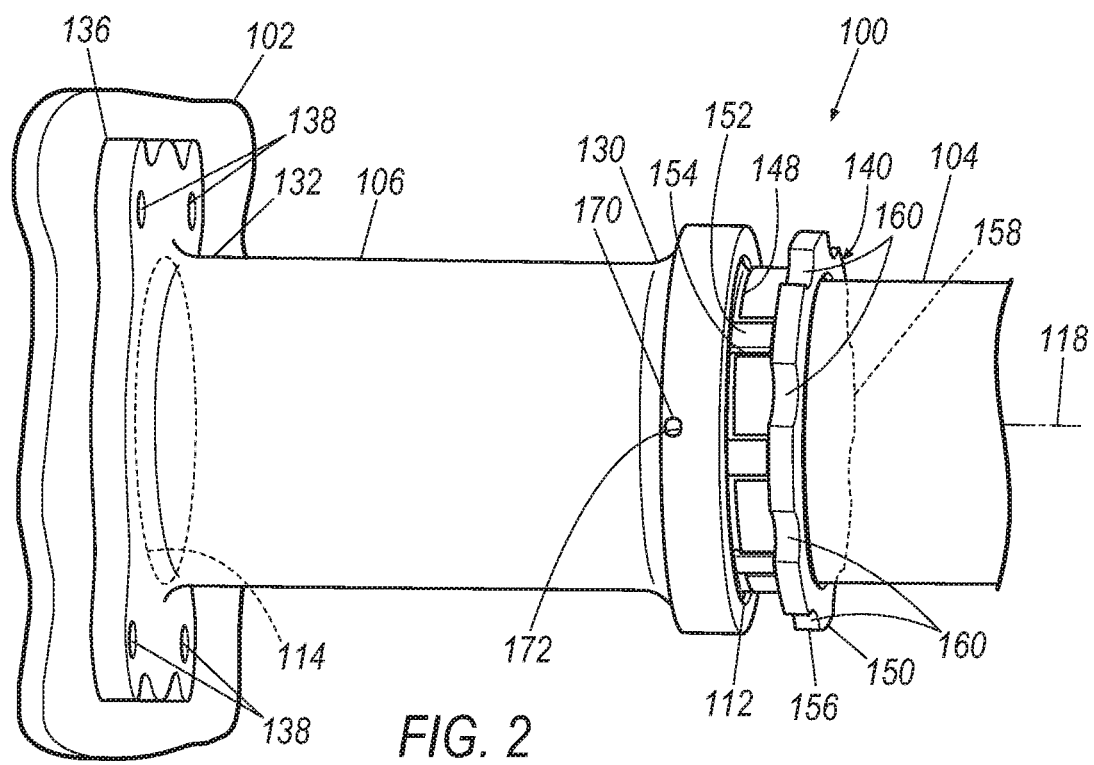
FIG. 2 is a an enlarged side view of the exemplary assembly of FIG. 1, showing the collar being held within the housing so as to connect to bulkhead and fluid line to one another.

The housing 106 may have an inner diameter surface 110, a first opening 112 and a second opening 114. In addition, the collar assembly 180 may have a portion 116 received within the first opening 112. However, the collar assembly 180 may instead be received in the second opening 114. The collar assembly 180 may be moved along a longitudinal axis 118 of the housing 106 from an unlatched position (FIG. 1) to a latched position (FIG. 2). When the collar assembly 180 is disposed in the latched position, a resilient annular member, such as the main retention ring 120 (FIGS. 4-6), is carried by the housing 106 and snap-fits onto a series of grooves 166 (FIG. 1) or otherwise fastens to the collar so as to hold the collar assembly 180 within the housing 106. Furthermore, the assembly 100 may also include a retainer 122 (FIGS. 4 and 6-8), e.g. the redundant locking clip 122 that provides redundant fastening or facilitates the resilient annular member 120 with holding the collar 148 in the housing 106. In particular, the redundant locking clip 122 may be a resilient wire received within an annular seat 124 formed in the inner diameter surface 110 of the housing 106. The redundant locking clip 122 can also have feet 126 extending radially inward from the inner diameter surface 110 of the housing, such that the collar 140 may be pivoted from the latched position (FIG. 7) to a locked position (FIG. 8). When the collar assembly 180 is disposed in the locked position, the feet 126 cooperate with lateral channels 128 (FIG. 4) formed in the collar 140 and prevent removal of the collar assembly 180 from the housing assembly 181. In this example, an individual may use only one hand to install the collar assembly 180 in the housing assembly 181, first by inserting the collar 140 into the housing assembly 181 and then twisting the collar 140 to provide redundant or additional fastening, thus improving the connection between corresponding fluid handling components in narrow spaces of an aircraft structure.

Figure 3:
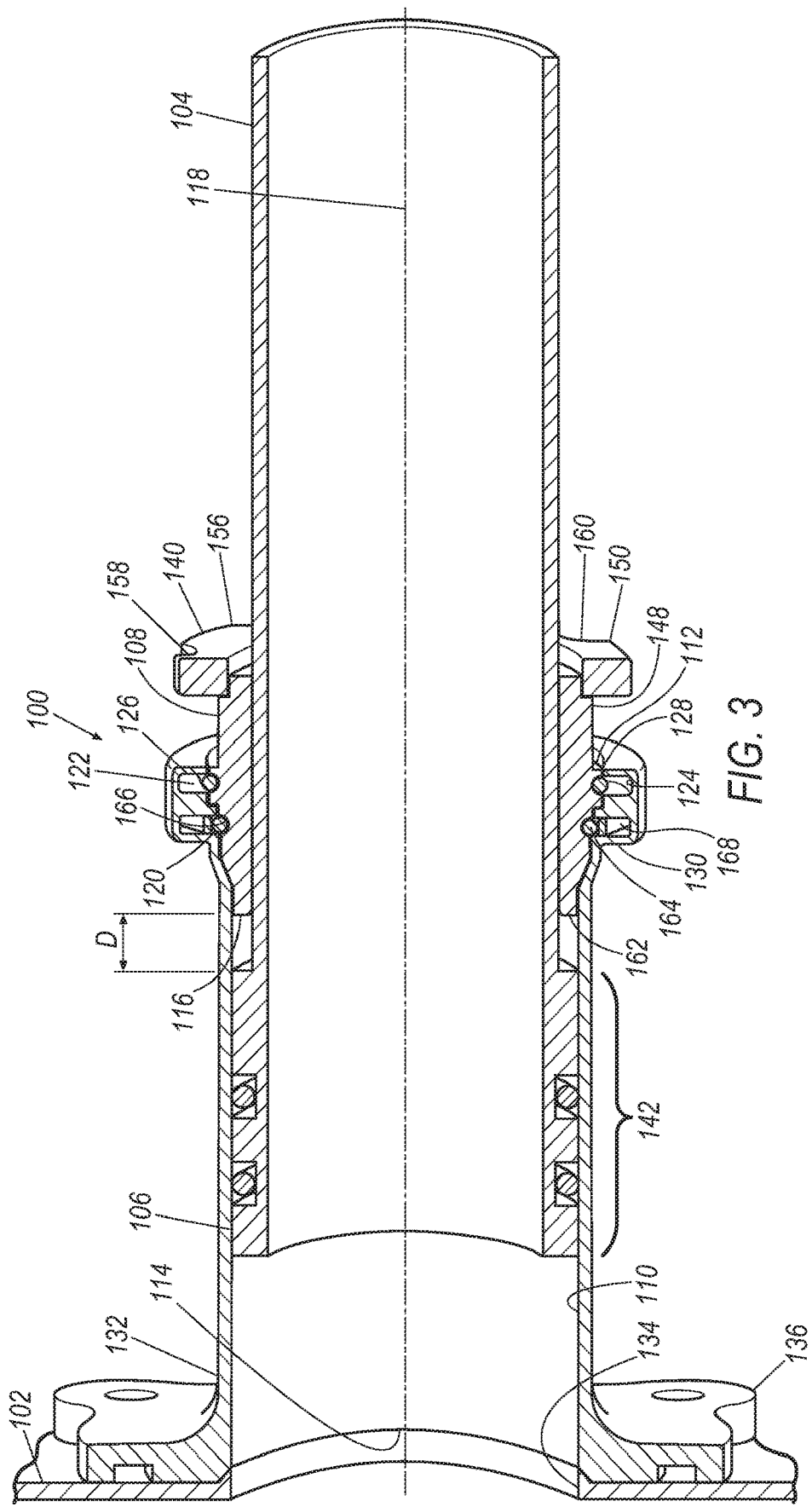
FIG. 3 is a cross-sectional view of the exemplary assembly, as taken along two diametrically opposite lands of the retainer.

As shown in FIG. 3, the exemplary bulkhead connector assembly 100 ("connector assembly") can include a housing 106, which in this form is a bulkhead adapter that is mounted to a bulkhead 102. In particular, the housing 106 may have first and second end portions 130, 132, and the second end portion 132 may define a second opening 114 that communicates with a port 134 formed in the bulkhead 102. The second end portion 132 may also have an annular flange 136 that includes a series of spaced apart holes 138 used to receive a plurality of bolt fasteners (not shown) for attaching the housing 106 to the bulkhead 102. However, the housing 106 can instead be attached to a tubing section or other suitable fluid handling components (e.g. pumps, fluid or flow sensors, re-fueling receivers, tank vent ports or other such devices) by any suitable fastening method. Furthermore, the housing 106 also has an inner diameter surface 110 extending between the first and second end portions 130, 132. The inner diameter surface 110 in this form provides a linear cylindrical passage between the first and second openings 112, 114. However, the housing 106 may have inner surfaces having other configurations and passages associated with those configurations, such as those elbows, T-fittings and housings with more than two openings.

Referring again to FIG. 3, the first end portion 130 of the housing 106 may define a first opening 112 that receives the conduit 104, as well as the collar 148 that is carried by the conduit 104. The conduit 104 is slidably carried within the collar 148 and permit movement of the conduit 104 and the associated aircraft structure upon which the conduit 104 and the assembly 100 are attached. In particular, the collar 148 has an inner diameter configured to slidably pass a portion of the conduit 104 therethrough up to an enlarged end portion 142 of the conduit 104 that has an outer diameter that is larger than the inner diameter of the collar 148. While in this embodiment the conduit 104 is a fuel or vent line, the conduit 104 can instead be other suitable fluid handling components.

Figure 4:
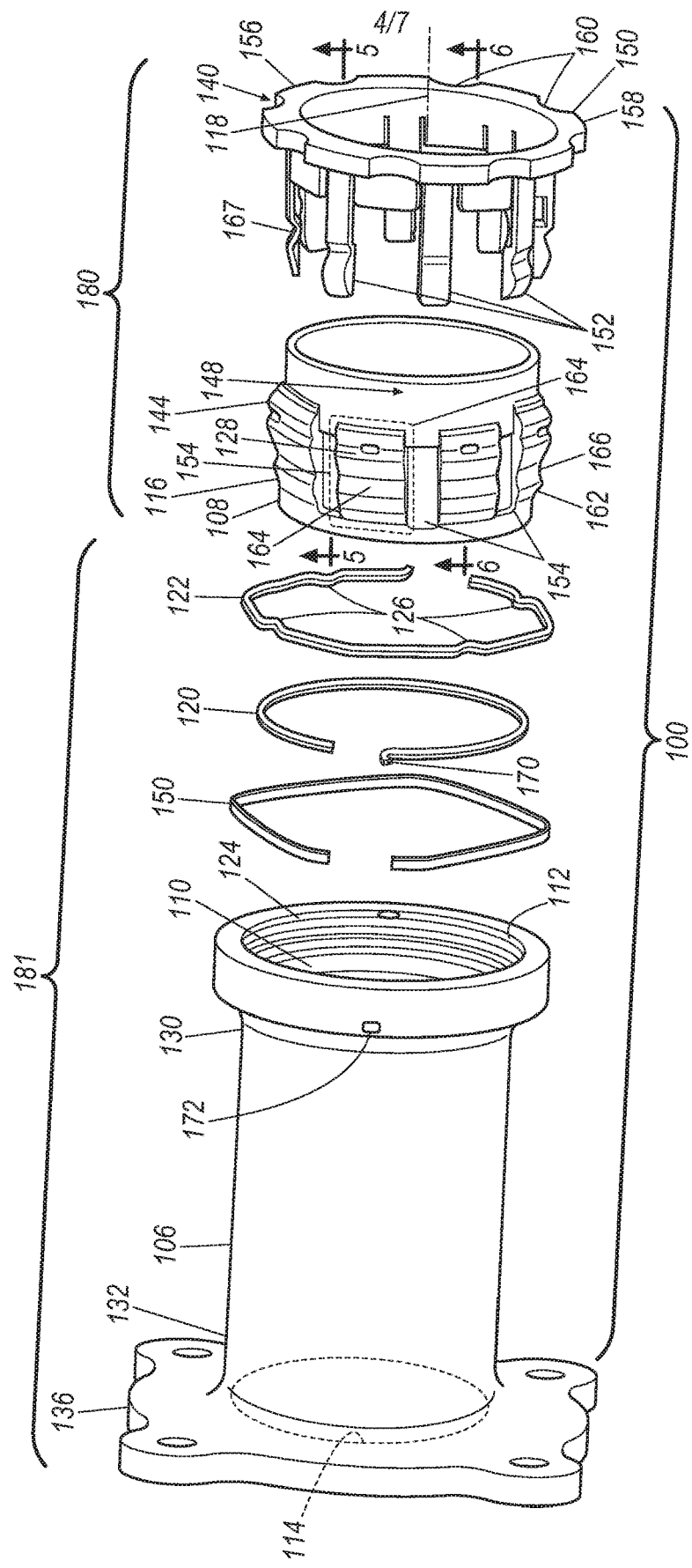
FIG. 4 is an exploded view of the exemplary assembly of FIG. 2, showing the handle including a ring that has multiple fingers interdigitated with lands formed in the retainer.

As best shown in FIG. 4, the collar 148 may have an outer surface 144 configured to cooperate with the handle 140, the main retention ring 120 and a redundant locking clip 122 to hold the conduit 104 within the housing 106. In particular, the outer surface 144 can have a series of lands 164, which are spaced apart from each other about the circumference of the collar 148 and are disposed parallel to the longitudinal axis 118. The handle 140 can include a ring 150 and a plurality of resilient fingers 152, which extend from the ring 150 and are disposed parallel to the longitudinal axis 118. The lands 164 on the collar 148 can define a plurality of open-ended longitudinal channels 154, which are spaced apart along the circumference of the collar 148 and disposed parallel to the longitudinal axis 118. The longitudinal channels 154 can receive the resilient fingers 152 of the handle 140, so as to interdigitate or alternate the resilient fingers 152 and the lands 164 with one another and snap-press-fit the handle 140 to the collar 148

Figure 5:
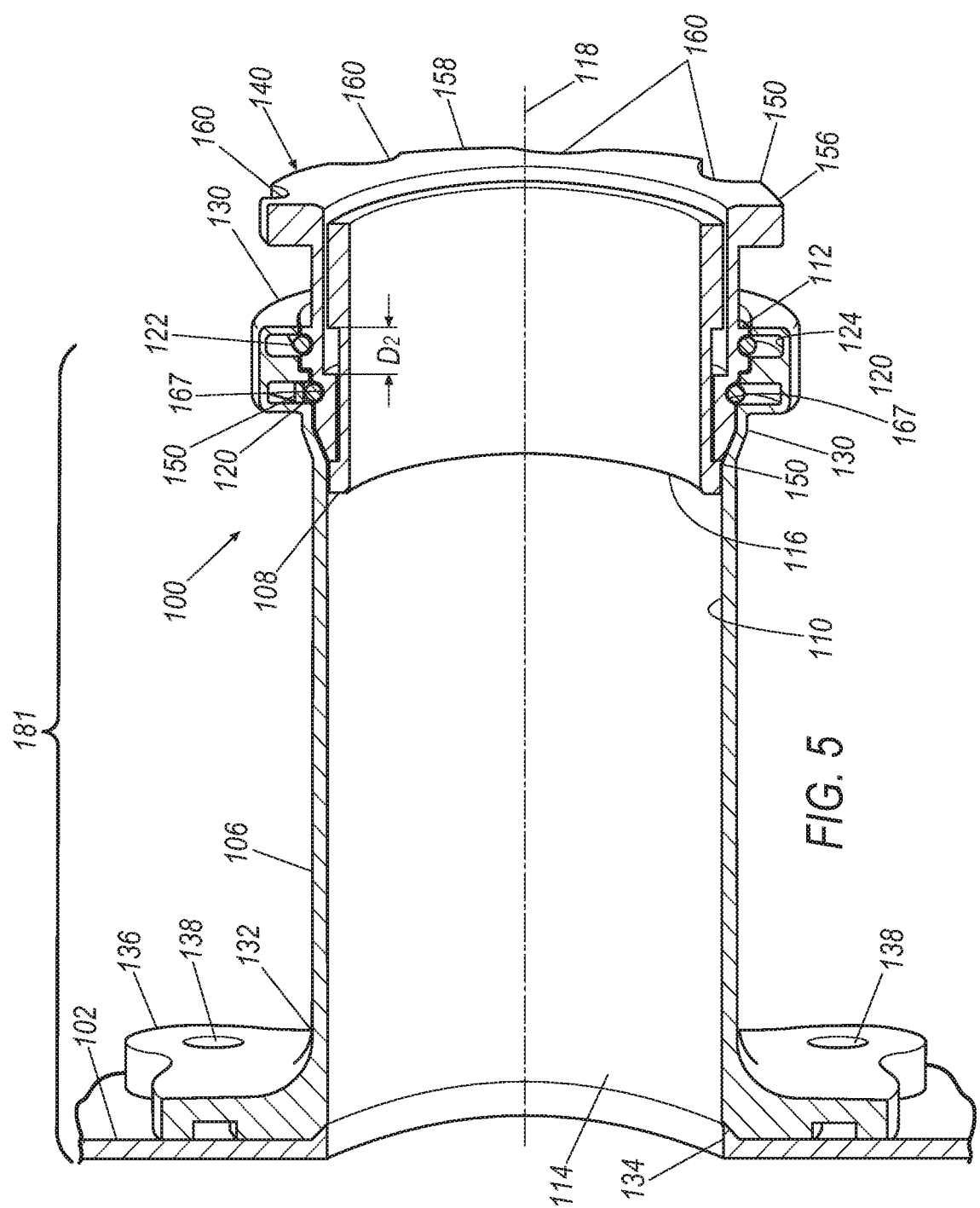
FIG. 5 is a cross-sectional side view of the exemplary assembly of FIG. 2, as taken along two diametrically opposite fingers of the collar.

As best shown in FIG. 5, the fingers 152 can function as an ejection mechanism for the collar assembly 180. In particular, the handle 140 once assembled to the collar 148 is can slide axially back and forth within and on the collar 148 by a distance of $D_2$. Moreover, when the handle 140 is pulled axially away from the housing 106 by at least a distance of $D_2$, each finger includes a groove 167 with an inclined surface or sloped wall, which engages the main retention ring 120 so as to force the main retention ring 120 to expand radially outward into the recess 168. Thus, the collar assembly 180 may be removed from the housing assembly 181.

The longitudinal channels 154 may further receive the feet 126 of the redundant locking clip 122, as the collar assembly 180 is moved between the unlatched position (FIG. 1) and the latched position (FIG. 2). The handle 140 may further include a knob 156, which in this form is an edge 158 of the ring 150 with indentations 160 formed along the perimeter of the edge 158 to permit an individual to use one hand to insert the collar assembly 180 into the housing 106 along a longitudinal axis 118 and then pivot or rotate the handle 140 and the collar assembly 180 about the longitudinal axis between the latched position (FIG. 7) and the locked position (FIG. 8).

Each land 164 has an inclined surface 162 terminating at a notch 166 (FIGS. 4 and 6), and each finger 152 has a seat 167 (FIGS. 4 and 5), such that the notches 166 and the seats 167 may be circumferentially aligned to receive the main retention ring 120 and hold the collar 148 in the housing 106 to connect the conduit 104 and bulkhead 102 to each other. The main retention ring 120 in one form may be a spring clip that is in part disposed in an annular recess 168 formed in the inner diameter surface 110 of the housing 106 and has a tang 170 received in a hole 172 formed in the housing 106 to fasten the clip 120 to the housing 106. The clip may have a coefficient of stiffness, such that the clip snap-fits into the notches 166 and the seats 167 with sufficient speed and force so as to generate auditory feedback that indicates the initial connection between the retention clip and the collar. The coefficient of stiffness may also provide a predetermined minimum force that maintains the connection between the collar 148 and the housing 106 and thus retain the conduit 104 within the housing 106. The clip can have a coefficient of stiffness and be further configured to absorb axial forces created by hydraulic fluid pressures and thermal contraction of the conduit.

As best shown in FIG. 4, the outer surface 144 of each land 164 further includes a lateral channel 128, which receives a corresponding foot 126 of the retainer to facilitate the main retention ring 120 with holding the conduit 104 in the housing 106, when the collar is pivoted from the latched position to the locked position. In particular, each lateral channel 128 can extend perpendicularly from the longitudinal channel 154.

Figure 7:
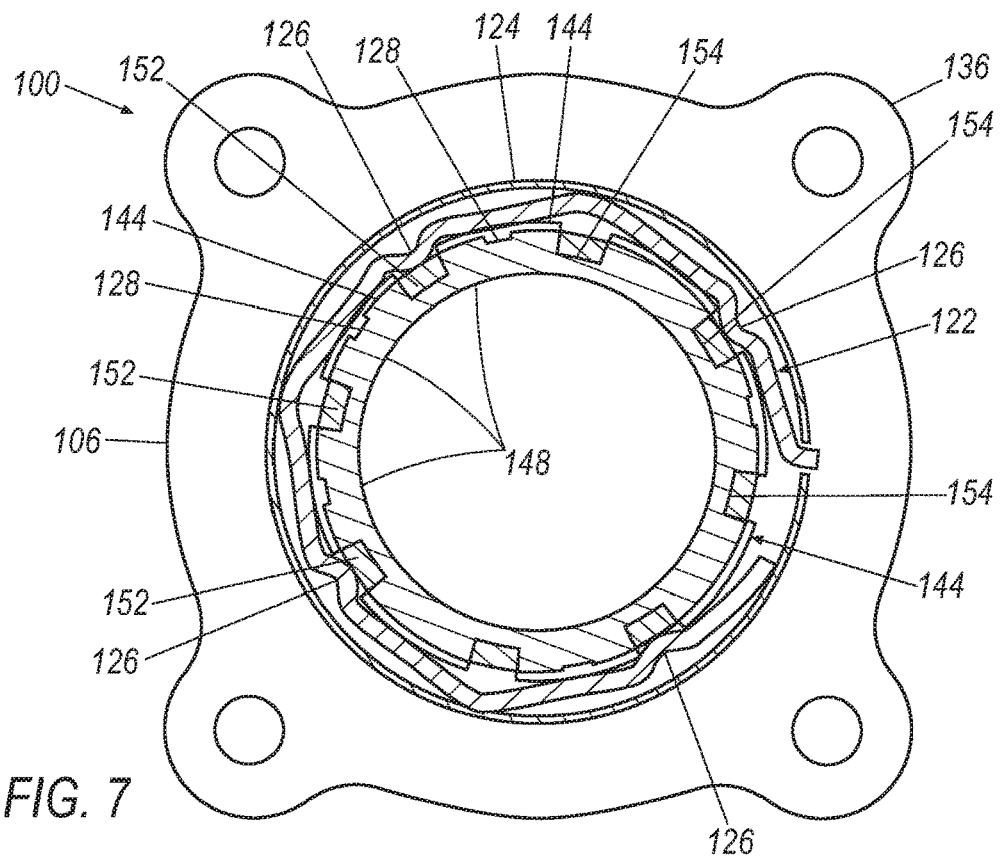
FIG. 7 is a cross-sectional end view of the exemplary assembly of FIG. 2, showing the assembly including a retainer that has a series of feet disposed within channels formed in the collar.
Figure 8:
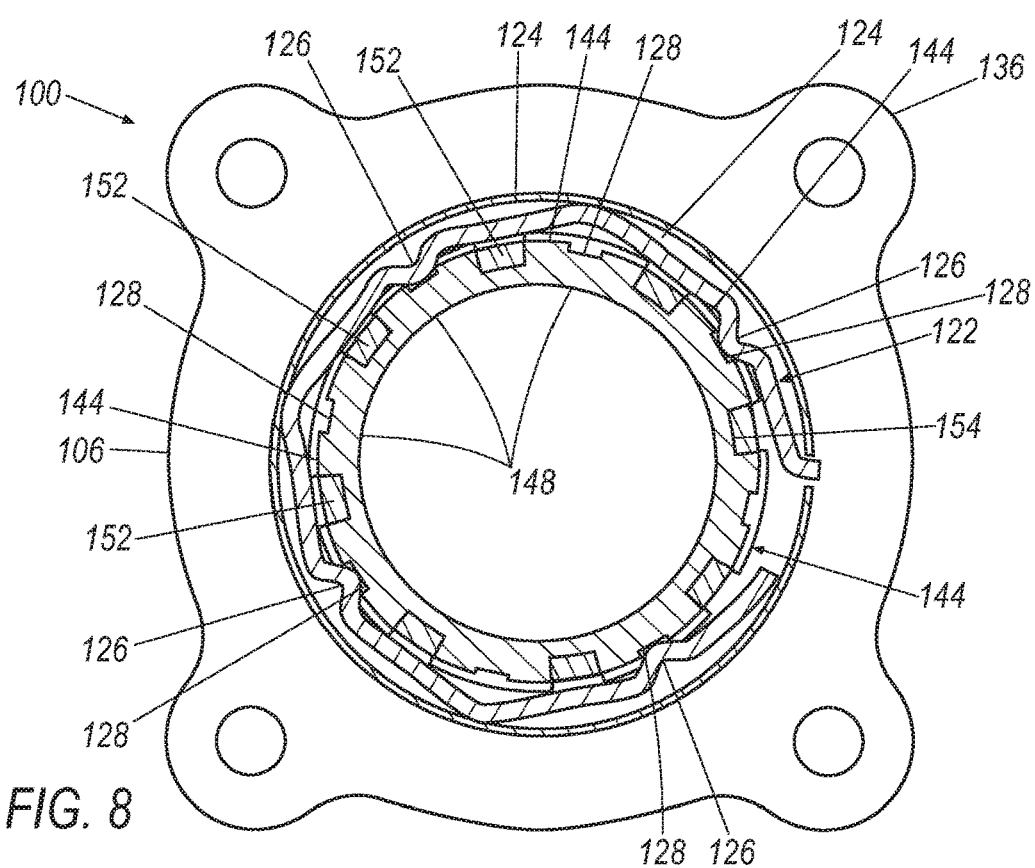
FIG. 8 is a cross-sectional end view of the exemplary assembly of FIG. 7, showing the feet disposed within

FIGS. 7 and 8 are radial sectional views that illustrate an exemplary relationship between the feet 126 and the pockets 128, before and after a rotational locking function, respectively. A secondary retention system is provided by the feet 126 of the clip 122 being engaged within the pockets 128, thus providing the redundant locking and retention. FIG. 7 was also shown to indicate that the collar assembly 181 can be inserted into the housing 106, at only one rotational orientation condition, in which the feet 126 engage the slots 154 and slide over the fingers 152 in order to insert the collar 148 into the housing 106 with a sliding clearance between the feet 152 and the fingers 154. The redundant locking clip 122 may be made of a resilient material having a coefficient of stiffness, such that the feet 126 provide a minimum predetermined force for maintaining the connection between the collar 148 and the housing 106. In addition, the coefficient of stiffness may be sufficiently high, such that the feet 126 impacts the collar 148 with sufficient speed and force to generate auditory feedback indicating that the feet 126 are received in the pockets 128.

Figure 6:
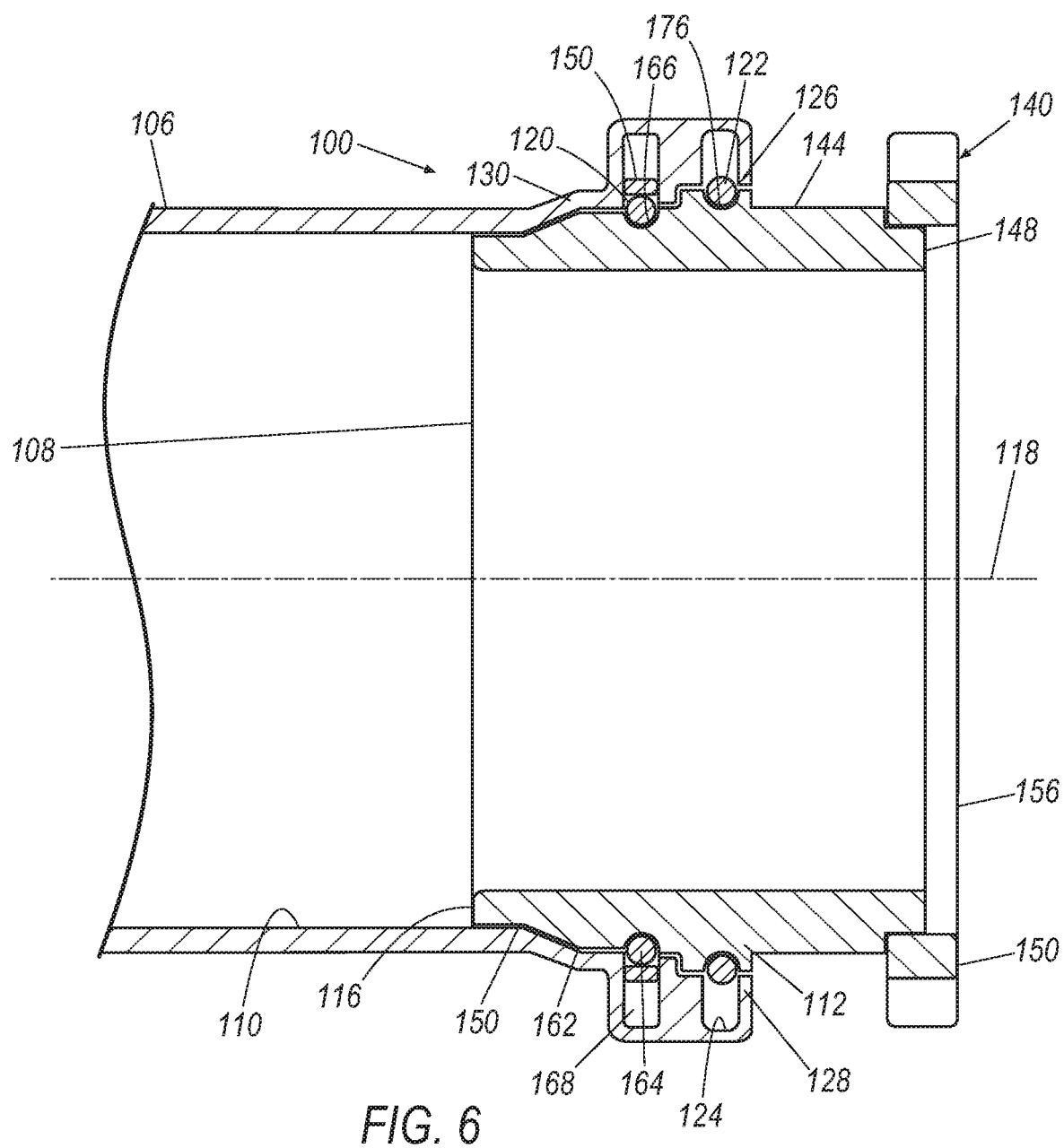
FIG. 6 is a cross-sectional side view of the exemplary assembly of FIG. 2, as taken along two diametrically opposite lands of the retainer.

Referring to FIGS. 4-6, the assembly 100 may further include a bonding ring 150 that is received within an annular recess 168 formed in the inner diameter surface 110 of the housing 106. The bonding ring 150 may extend between the housing 106 and the retention ring 120 to provide an electrically conductive path therebetween. The bonding ring 150 also centers and maintains retention ring's 120 radial alignment and position within the annular recess 168. This facilitates the sliding insertion of the collar's 180 nose 108 by the retention ring 120.

The present invention has been particularly shown and described with reference to the foregoing non-limiting examples, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A bulkhead connector assembly, comprising:
 a housing having an inner diameter surface, a first opening and a second opening;
 a retainer attached to the housing and has at least one foot extending radially inward from the inner diameter surface;
 a collar having a portion received within one of the first and second openings, and the collar has an outer surface that cooperates with the at least one foot to hold a conduit within the housing; and a handle attached to the collar and configured to insert the collar into the housing along a longitudinal axis and pivot the collar about the longitudinal axis between a latched position and a locked position;

wherein the handle includes a ring and a plurality of fingers that extend from the ring, and the collar has a plurality of longitudinal channels that receive the plurality of fingers to fasten the collar to the handle; and wherein the longitudinal channels are defined by a plurality of lands formed in the collar, and the lands have a plurality of notches that receive a resilient annular member to hold the collar and the conduit within the housing when the collar is moved to the latched position.

2. The bulkhead connector assembly of claim 1, wherein the ring includes a knob to facilitate actuation of the ring.

3. The bulkhead connector assembly of claim 1, wherein the handle pivots about a longitudinal axis between the latched and locked positions, and the fingers are disposed parallel to the longitudinal axis.

4. The bulkhead connector assembly of claim 1, wherein the collar pivots about the longitudinal axis between the latched and locked positions, and the longitudinal channels are disposed parallel to the longitudinal axis.

5. The bulkhead connector assembly of claim 1, wherein the fingers have a plurality of seats that receive a resilient annular member to hold the collar and the conduit within the housing when the ring is moved to the latched position.

6. The bulkhead connector assembly of claim 1, wherein the retainer is a resilient wire received within an annular seat formed in the inner diameter surface of the housing.

7. The bulkhead connector assembly of claim 1, further comprising a bonding ring received within an annular recess formed in the inner diameter surface of the housing and extending between the housing and a primary retention ring to provide an electrically conductive path therebetween.

8. The bulkhead connector assembly of claim 1, further comprising a bonding ring received within an annular recess formed in the inner diameter surface of the housing and extending between the housing and the primary retention ring to provide and maintain centering function for the primary retention ring.

9. The bulkhead connector assembly of claim 1, wherein the collar has an outer surface that includes at least one lateral channel extending along an outer circumference of the collar to hold the collar in the latched position.

10. The bulkhead connector assembly of claim 9, wherein the at least one lateral channel has a bottom surface that includes a pocket formed therein to receive a tip of the at least one foot of the retainer and hold the collar in the locked position.

11. A bulkhead connector assembly, comprising:
a housing having an inner diameter surface, a first opening and a second opening;
a collar having a portion received within one of the first and second openings;
a retainer attached to the housing and having a plurality of feet extending radially inward from the inner diameter surface; and
a resilient annular member attached to the housing;
wherein the resilient annular member and the plurality of feet hold the collar in the housing;
wherein the collar has a plurality of longitudinal channels that are disposed parallel to a longitudinal axis of the housing, and the feet of the retainer move through the longitudinal channels between the unlatched and latched positions; and
wherein the resilient annular member is received in a plurality of notches formed in the collar to hold the collar in the housing when the collar is moved to the latched position.

12. The bulkhead connector assembly of claim 11, wherein the feet of the retainer are received in a plurality of lateral channels extending along an outer circumference of the collar, and the feet are received in the lateral channels when the collar is pivoted to a locked position to hold the collar in the housing.

13. The bulkhead connector assembly of claim 12, wherein each of the lateral channels has a bottom surface with pocket therein to receive a tip of the respective feet and hold the feet in the lateral channels.

14. A bulkhead connector assembly, comprising:
a housing having an inner diameter surface, a first opening and a second opening;
a retainer attached to the housing and has at least one foot extending radially inward from the inner diameter surface;
a collar having a portion received within one of the first and second openings, and the collar has an outer surface that cooperates with the at least one foot to hold a conduit within the housing; and
a handle attached to the collar and configured to insert the collar into the housing along a longitudinal axis and pivot the collar about the longitudinal axis between a latched position and a locked position;
wherein the handle includes a ring and a plurality of fingers that extend from the ring, and the collar has a plurality of longitudinal channels that receive the plurality of fingers to fasten the collar to the handle; and
wherein the fingers have a plurality of seats that receive a resilient annular member to hold the collar and the conduit within the housing when the ring is moved to the latched position.

15. A bulkhead connector assembly, comprising:
a housing having an inner diameter surface, a first opening and a second opening;
a retainer attached to the housing and has at least one foot extending radially inward from the inner diameter surface;
a collar having a portion received within one of the first and second openings, and the collar has an outer surface that cooperates with the at least one foot to hold a conduit within the housing; and
a handle attached to the collar and configured to insert the collar into the housing along a longitudinal axis and pivot the collar about the longitudinal axis between a latched position and a locked position;
wherein the handle includes a ring and a plurality of fingers that extend from the ring, and the collar has a plurality of longitudinal channels that receive the plurality of fingers to fasten the collar to the handle; and
wherein the retainer is a resilient wire received within an annular seat formed in the inner diameter surface of the housing.

16. A bulkhead connector assembly, comprising:
a housing having an inner diameter surface, a first opening and a second opening;
a retainer attached to the housing and has at least one foot extending radially inward from the inner diameter surface; and a collar having a portion received within one of the first and second openings, and the collar has an outer surface that cooperates with the at least one foot to hold a conduit within the housing;

wherein the collar has an outer surface that includes at least one lateral channel extending along an outer circumference of the collar to hold the collar in the latched position; and wherein the at least one lateral channel has a bottom surface that includes a pocket formed therein to receive a tip of the at least one foot of the retainer and hold the collar in the locked position.

17. A bulkhead connector assembly, comprising:

a housing having an inner diameter surface, a first opening and a second opening;

a collar having a portion received within one of the first and second openings;

a retainer attached to the housing and having a plurality of feet extending radially inward from the inner diameter surface; and a resilient annular member attached to the housing;

wherein the resilient annular member and the plurality of feet hold the collar in the housing;

wherein the collar has a plurality of longitudinal channels that are disposed parallel to a longitudinal axis of the housing, and the feet of the retainer move through the longitudinal channels between the unlatched and latched positions; and wherein the resilient annular member is received in a plurality of notches formed in a handle to hold the handle in the housing when the collar is moved to the latched position.

18. A bulkhead connector assembly, comprising:

a housing having an inner diameter surface, a first opening and a second opening;

a collar having a portion received within one of the first and second openings;

a retainer attached to the housing and having a plurality of feet extending radially inward from the inner diameter surface; and a resilient annular member attached to the housing;

wherein the resilient annular member and the plurality of feet hold the collar in the housing;

wherein the collar has a plurality of longitudinal channels that are disposed parallel to a longitudinal axis of the housing, and the feet of the retainer move through the longitudinal channels between the unlatched and latched positions;

wherein the feet of the retainer are received in a plurality of lateral channels extending along an outer circumference of the collar, and the feet are received in the lateral channels when the collar is pivoted to a locked position to hold the collar in the housing; and wherein each of the lateral channels has a bottom surface with pocket therein to receive a tip of the respective feet and hold the feet in the lateral channels.

* * * * *